United States Patent
Takiguchi et al.

(10) Patent No.: US 6,333,748 B1
(45) Date of Patent: *Dec. 25, 2001

(54) MULTIMEDIA DATABASE CREATION AND MANAGEMENT UTILIZING AN EVALUATION OF FILE CONTENTS IN THE DATABASE MANAGEMENT

(75) Inventors: Hideo Takiguchi, Kawasaki; Fumiaki Takahashi, Machida, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/498,876

(22) Filed: Jul. 6, 1995

(30) Foreign Application Priority Data

Jul. 13, 1994 (JP) .................................... 6-161106

(51) Int. Cl.⁷ ...................................... G06F 17/30
(52) U.S. Cl. ............................ 345/589; 345/763
(58) Field of Search .................... 395/131, 790, 395/333, 334, 348; 382/220, 218, 209, 306, 305; 707/104; 345/431, 333, 334, 348, 589, 763

(56) References Cited

U.S. PATENT DOCUMENTS

| | | | |
|---|---|---|---|
| 5,249,263 | * 9/1993 | Yanker ................................. | 395/131 |
| 5,270,806 | * 12/1993 | Venable et al. ....................... | 358/500 |
| 5,311,212 | * 5/1994 | Beretta ................................. | 345/150 |
| 5,323,314 | * 6/1994 | Baber et al. .............................. | 705/8 |
| 5,371,844 | * 12/1994 | Andrew et al. ....................... | 395/155 |
| 5,432,896 | * 7/1995 | Hwong et al. ....................... | 395/129 |
| 5,473,738 | * 12/1995 | Hamlin et al. ....................... | 395/131 |
| 5,513,310 | * 4/1996 | Megard et al. ...................... | 395/161 |
| 5,533,186 | * 7/1996 | Tanahashi et al. ................... | 395/164 |
| 5,550,563 | * 8/1996 | Matheney et al. ................... | 345/158 |
| 5,555,366 | * 9/1996 | Teig et al. ............................ | 395/161 |
| 5,579,471 | * 11/1996 | Barber et al. ........................ | 395/326 |

OTHER PUBLICATIONS

Director for the MacIntosh, version 3.1 Studio Manual, Macromedia, Inc., 1991, pp. 68–75.*

* cited by examiner

Primary Examiner—Stephen S. Hong
(74) Attorney, Agent, or Firm—Fitzpatrick, Cella, Harper & Scinto (57) ABSTRACT

A graphic, representing possible values of attribute data for multimedia data to be stored, is displayed, and a desired position on the graphic is designated to store the multimedia data and the attribute data. Multimedia data and attribute data of the multimedia data are stored in a memory, status of the attribute data is displayed in a graphic form, a desired position on the graphic is designated, and the multimedia data is read form the memory in accordance with the designation.

5 Claims, 12 Drawing Sheets

MULTIMEDIA DATABASE CREATION AND MANAGEMENT UTILIZING AN EVALUATION OF FILE CONTENTS IN THE DATABASE MANAGEMENT

BACKGROUND OF THE INVENTION

1. Field of the Invention

The present invention relates to multimedia data processing apparatus and method, and more particularly to apparatus and method for registering and retrieving data such as document, image and audio data.

2. Related Background Art

Databases for registering and retrieving various types of data have been known. In the prior art database, both characters and numerals are handled, the scale of the system is large, and the structuring (setting up) and management of the database are limited to a specific person.

In a modern database, not only characters and numerals but also multimedia data such as images and audio are added, and in addition to the conventional large-scale database handling characters and numerals, small-scale and personal databases such as an image library are gradually coming into use. The structuring and management of such a database, which are handled by some one specific person in the conventional database, should be under the control of the user of the database.

As multimedia data has been becoming readily available on the computer, application software called catalog software in which the multimedia data is managed like a library and a required file is picked from a list has become available. Catalog software simplifies the operation of input and registration of attribute information as key words for the data and also simplifies the retrieval function.

Figure 1:
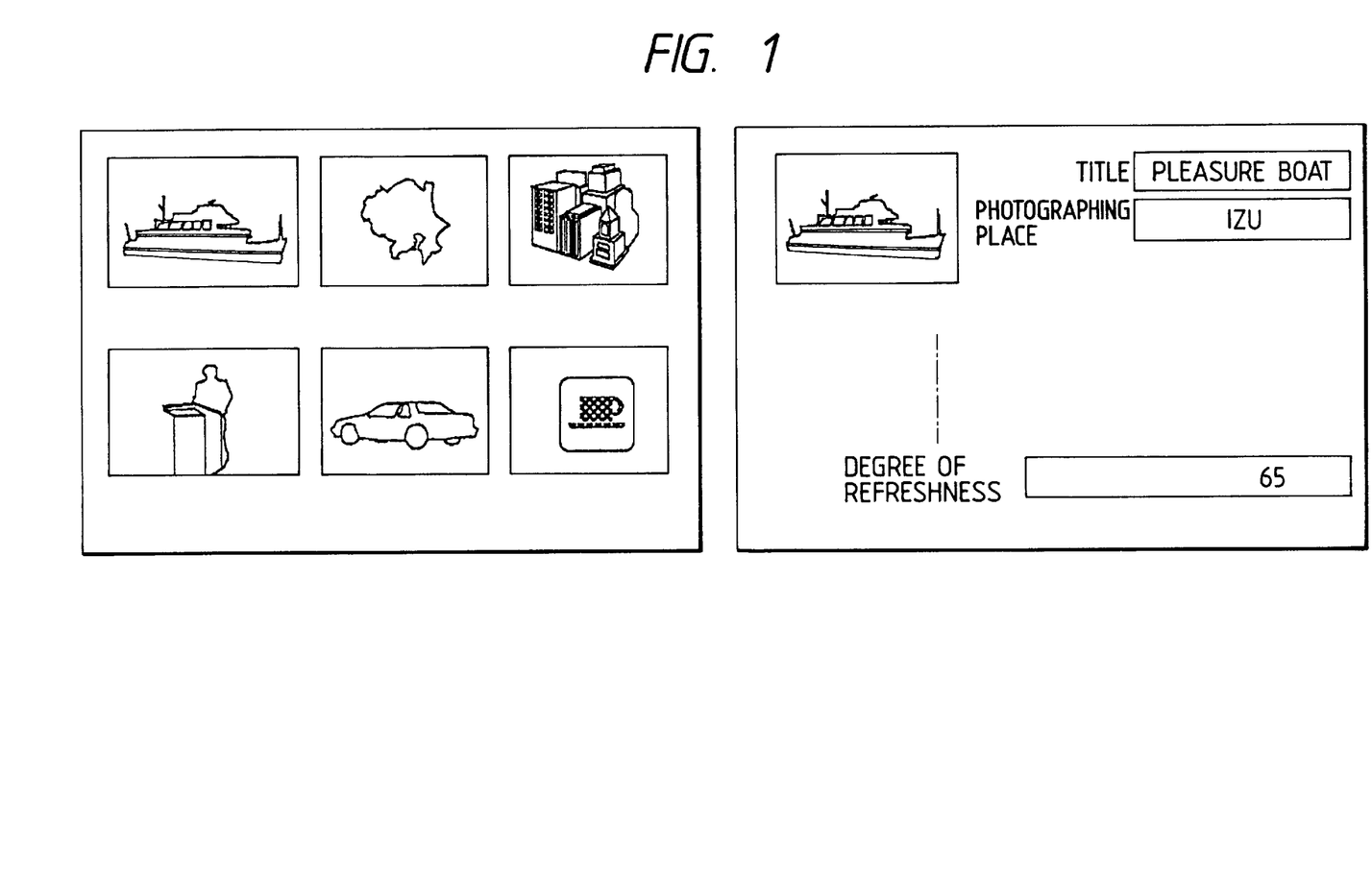
FIG. 1 illustrates catalog software.

FIG. 1 shows an example of the catalog software. FIG. 1 shows a still image catalog, in which a list of images registered in the database is displayed as shown at the left side of the drawing. As a user may designate any image from the displayed images together with a registration instruction, a registration scene as shown on the right side of the drawing appears.

The registration scene is provided with items of attribute information and input fields, and the registration is made by entering a value in the input field. In the illustrated example, fields representing photographed locations are displayed. The user may enter a location name by means of a keyboard.

As the attribute information in the catalog software, an item representing a fuzzy image such as a comfortable image or bright sound may be set and registered. In the example of FIG. 1, attribute information called a degree of refreshness representing a degree of refreshness the image gives is provided as the item representing the fuzzy image. The user may enter a numeric value to this field. In structuring such a database, the work which is largest in volume and which is most disliked by the user is the registration of the attribute information.

The attribute information is usually inputted by the user through the keyboard. The input operation must be conducted when the database is structured as well as each time the data is updated.

The data inputted from the keyboard must be accurate and this causes the increase of the work of the user and mental burden of the user.

In retrieving the data, the retrieval is instructed by inputting the characters and numerals to the registered value. The retrieval work is also burden of the user who utilizes the database.

By those reasons, while the database has become popular among the users, it is disliked by the users who use the personal computers mainly for word processing work.

In the catalog software, the attribute information is entered from the keyboard by entering characters and numerals as they are in the conventional database and the accurate input is required. In retrieving the data, the registered value must be reentered.

Further, when the fuzzy item is set as the attribute information, the decision as to which numeral is to be entered or which numeral is to be used for retrieval is the burden to the user.

SUMMARY OF THE INVENTION

It is an object of the present invention to solve the above problems.

It is another object of the present invention to allow effective use of the database by registering data in a simple manner.

In order to achieve the above objects, in accordance with one aspect of the present invention, there is provide a processing apparatus comprising, input means for inputting multimedia data, display means for displaying status of attribute data for the multimedia data in a graphic form, designation means for designating a desired position on the graphic and memory means for storing the attribute data in accordance with the designation by said designation means.

It is another object of the present invention to allow effective use of the database by retrieving data in a simple manner.

In order to achieve the above object, in accordance with other aspect of the present invention, there is provided a processing apparatus comprising, memory means for storing multimedia data and attribute data for the multimedia data, display means for displaying status of the attribute data in graphic form, designation means for designating a desired position on the graphic, and read means for reading the multimedia data from said memory in accordance with the designation by said designation means.

The above and other objects and features of the present invention will be apparent from the following detailed description of the preferred embodiments of the present invention in conjunction with the accompanying drawings.

DETAILED DESCRIPTION OF THE PREFERRED EMBODIMENTS

An embodiment of the present invention is now explained in detail with reference to the drawings.

Figure 2:
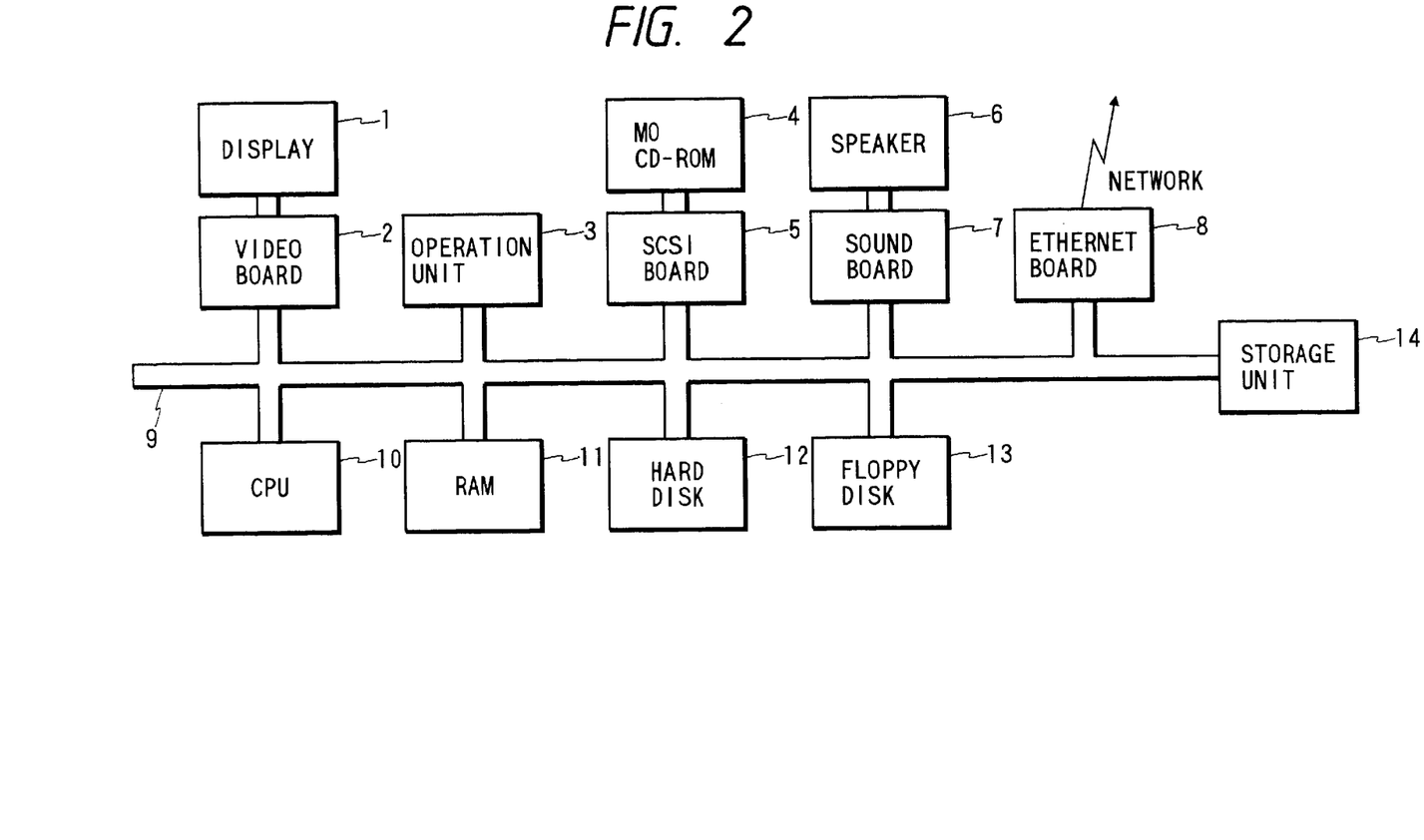
FIG. 2 shows a block diagram of a configuration of a database system in accordance with an embodiment of the present invention.

FIG. 2 shows a block diagram of a configuration of a database system in accordance with the embodiment of the present invention.

In FIG. 2, numeral 1 denotes a display for displaying a registered and retrieved image, numeral 2 denotes a video board for connecting the display 1 to a bus 9 in a personal computer, number 3 denotes a console unit (operation unit) including a keyboard and a mouse for entering attribute information to the database, numeral 4 denotes a disk such as a magneto-optical disk or a CD ROM, numeral 5 denotes SCSI board for connecting the disk 4 to the bus 9, numeral 6 denotes a speaker for monitoring registered and retrieved sound, numeral 8 denotes an Ethernet board for connecting an external network to the bus 9, numeral 9 denotes a bus for transmitting control signals and data among various units in the system, numeral 10 denotes a CPU for controlling an operation of the system, numeral 11 denotes a RAM for storing an operation program recorded in a hard disk 12, numeral 13 denotes a floppy disk on which multimedia data is recorded and numeral 14 denotes a memory for storing multimedia data and attribute information.

A database preparation and retrieval program of the system is stored in the hard disk 12 and it is loaded to the RAM 11 when the user instructs to start up the system and executed by the CPU 10.

The multimedia data which is the data for the database is stored in the hard disk 12, the disk 4 or the floppy disk 13 and it may be entered externally through a network. The user operates on the database program by using a command device such as the keyboard or the mouse to register and retrieve the data of the multimedia to monitor the data, the document or the image is displayed on the display 1 and the sound is reproduced by the speaker 6.

The registration of the multimedia in such a configuration is now explained.

Figure 3:
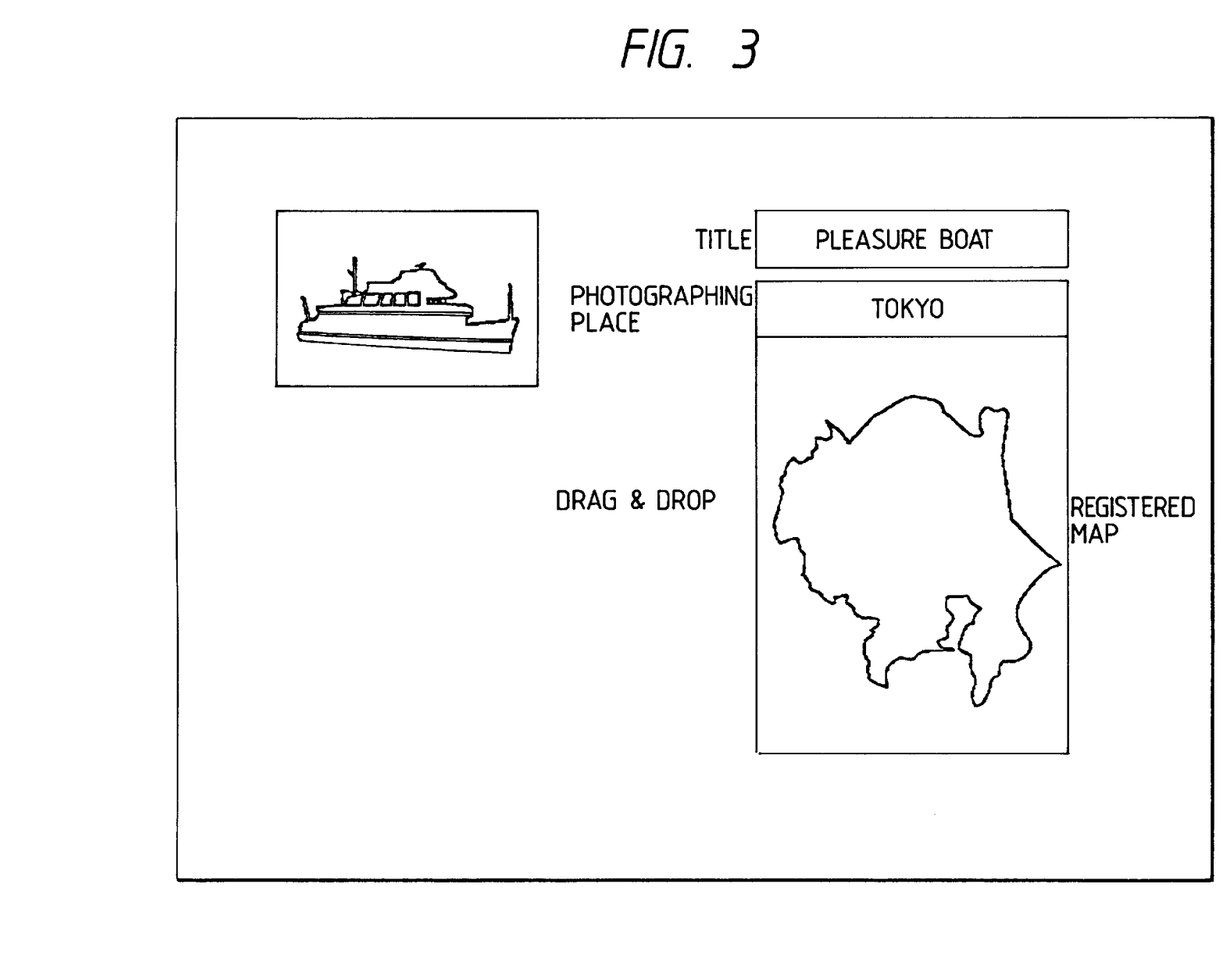
FIG. 3 shows a registration graphics in the embodiment.

FIG. 3 illustrates registration graphics. As shown in FIG. 3, when attribute information of photographed location is to be entered, an actual map is displayed on the display 1 and an image icon is moved by the console unit 3 and moved to a desired position (drag and drop). In the present configuration, in registering the photographed location, the user may register by the operation of the mouse only rather than to enter an actual location name by the keyboard in the conventional system.

The CPU 10 detects the position dropped on the map, detects the corresponding location name from the hard disk 12 storing the geographical names on the map and displays it in the photographed location field. If the displayed geographical name is OK, the user operates the console unit 3 and the CPU 10 stores the displayed image and the geographical name in the memory 14 and the registration operation of the photographed location is terminated.

The graphics representing the geographical names is initially stored in the database program and the user selects the graphic representing the geographical name to register the photographed location.

While the location has been explained as the attribute information, graphic representing a calendar may be displayed for the attribute information representing date and any other item which can be represented on graphics for the may attribute information be registered in the same manner.

A plurality of maps to be displayed may be provided so that the user may selectively use them. The maps may be prepared hierarchically so that a detailed location may be registered.

The registration of data when fuzzy image is set as the attribute information is now explained. In the present embodiment, a graph representing a degree of refreshness is displayed in registering data and the user drops an icon to a desired position to register the data.

Figure 4:
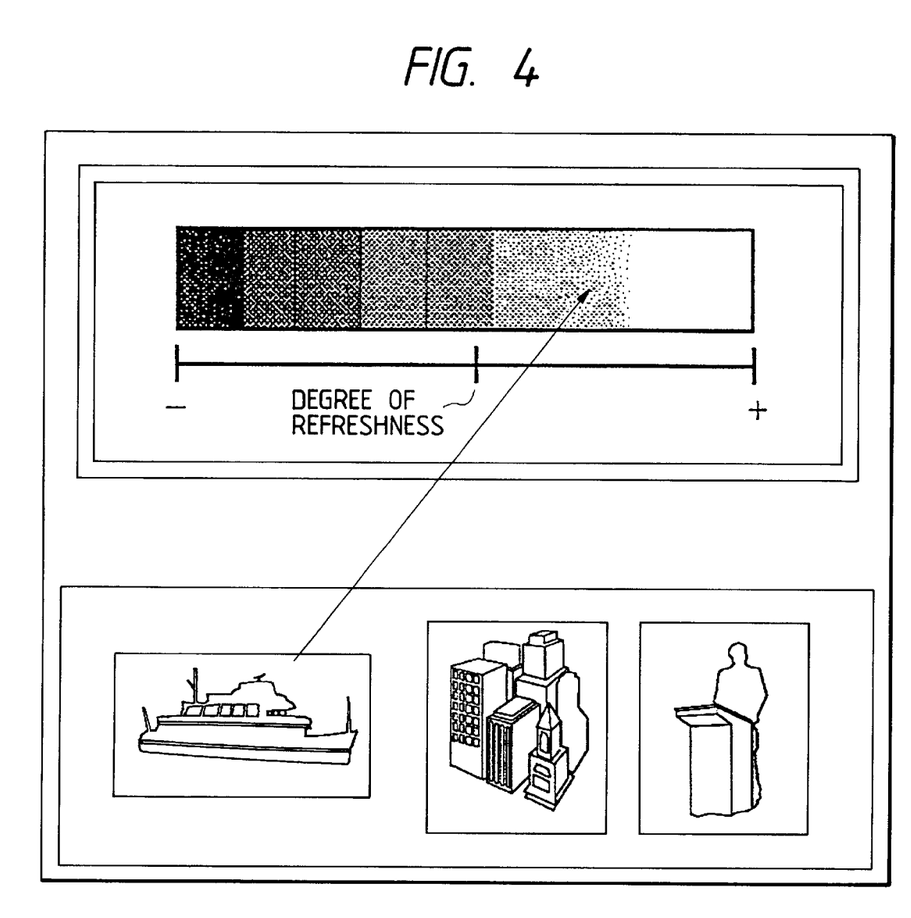
FIG. 4 illustrates a registration operation when attribute information is a fuzzy image.

FIG. 4 shows such a registration method for registering the degree of refreshness (by "refreshness" is meant the property that a person viewing the image feels refreshed as a result; by "degree of refreshness" is meant a quantification of the strength of that property of a given image).

In registering the data, when the degree of refreshness is designated as the attribute information, an image shown in FIG. 4 is displayed on the display 1. A graph representing the degree of refreshness and an icon of the multimedia data (image data in the illustrated example) to be registered are displayed on the display. The user selects the image by the pointing device such as the mouse of the console unit 3, moves it to a desired position on the graph and terminates the movement at that point so that it is registered as the degree of refreshness of the data.

The number of pixels n at the pointed position is registered as the degree of refreshness with the leftmost position on the graph being 0. The CPU 10 detects the pointed position on the graph and stores it in the memory 14 in association with the image then displayed. In the present embodiment, the range of possible numeral is a unit of the graph size (the number of pixels occupied on the screen) so that the range of numeral may be changed by changing the graph size. Alternatively, a range of value (for example, 0 to 100) rather than the graph size may be set.

In the present embodiment, since the graph representation used for the registration is also used for representing the attribute of the data and for the designation representation of the retrieval, the user need not know the actual numeric value used by the CPU 10 for the processing. Thus, the number of pixels on the screen which represents the resolution of the screen is used as the range of numeral.

Figure 5:
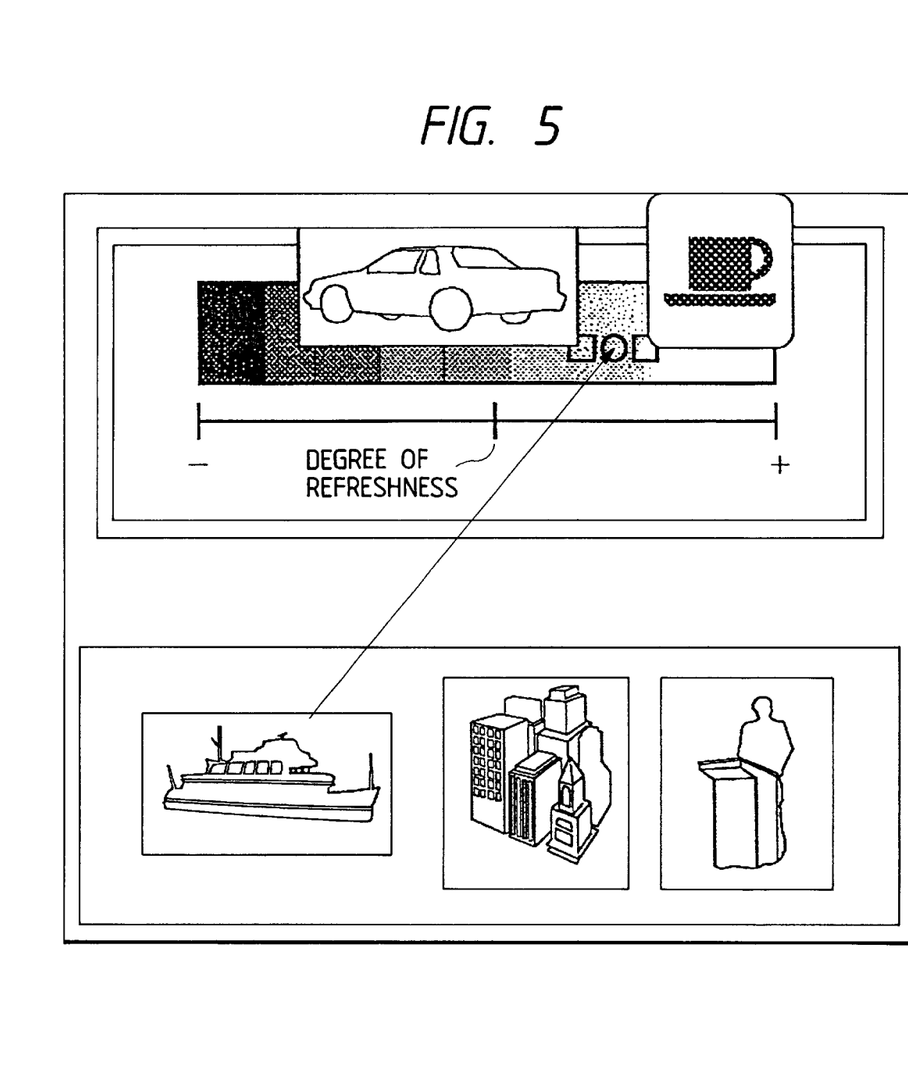
FIG. 5 illustrates an operation when registered data is displayed to register data.

In the above embodiment, the registration of the degree of refreshness by referring the image data to be registered has been explained. It would be more convenient if the registration may be made by comparing the degree of refreshness already registered so that a relative value may be registered. Thus, as shown in FIG. 5, the multimedia data already registered may be displayed at the front and back positions of the cursor on the graph. An operation therefor is now explained with reference to a flow chart of FIG. 6.

Figure 6:
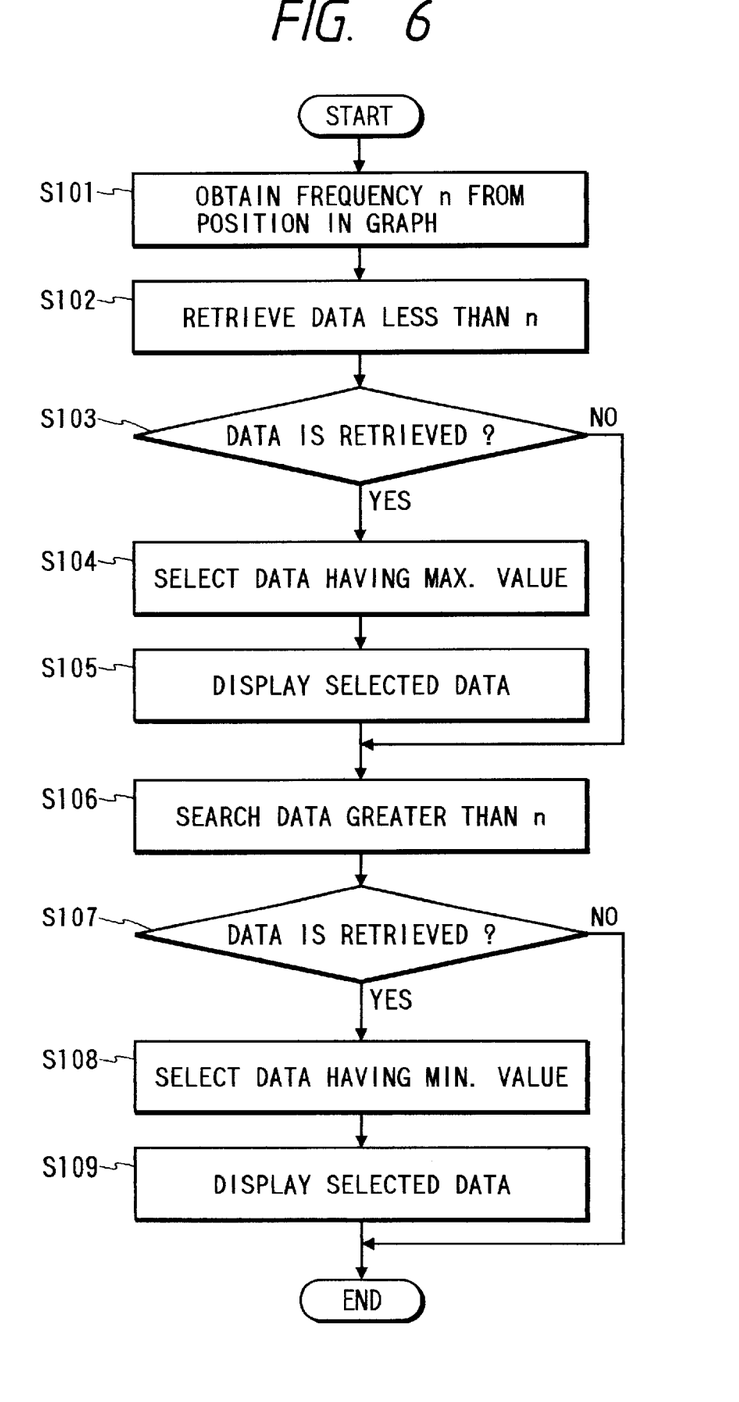
FIG. 6 shows a flow chart of an operation in retrieving registered data in the embodiment.

In registering data, when a menu of front/back display is selected, the CPU 10 first detects the degree n of refreshness from the position of the cursor on the graph (step S101). Data having smaller than n degree is retrieved (step S103), and if the data is retrieved maximum data among the retrieved data is selected (steps S103 and S104). If there are a plurality of data having maximum value, all of them may be selected or only one of them may be selected. A selection criterion may be a first picked-up one or a latest file. After the data is selected, the corresponding image is read from the memory 14 and displayed on the display 1 (step S105).

Similar retrieval is made for the data of no smaller than n and the one closest to n is selected and displayed (steps S106 to S109).

The user confirms the displayed data and if he/she determines that it is acceptable, he/she drops the mouse thereat. Otherwise, a similar operation is conducted at other position to compare with the registered data.

As described above, in registering the attribute information of the fuzzy image, the graph is displayed and the registration is made by using the graph. Thus, the burden of the user to determine the attribute value is reduced.

A display of the registered data is now explained with reference to FIG. 7.

Figure 7:
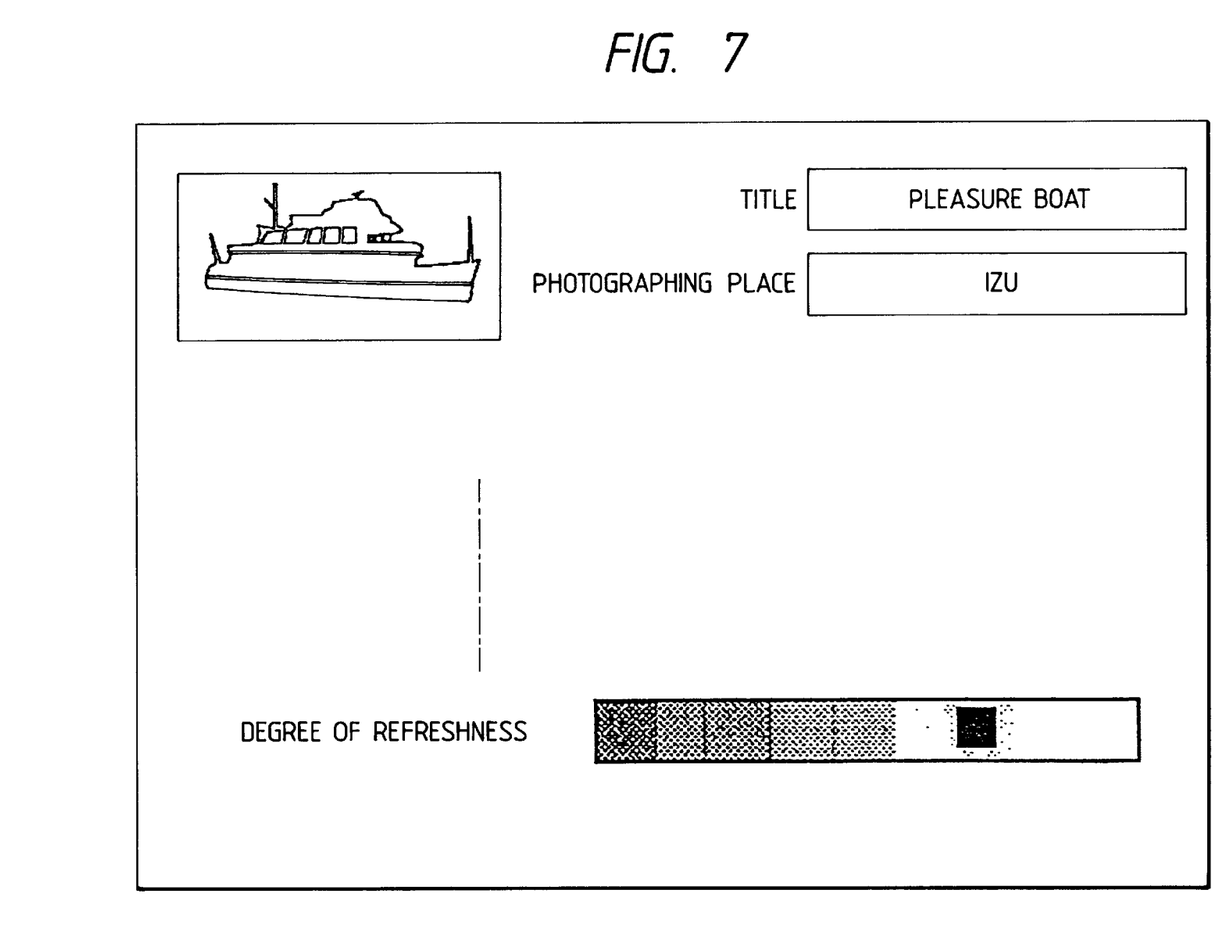
FIG. 7 shows display of the read registered data.

As seen from FIG. 7, the graph and the registered position rather than the numeric value in the conventional system are displayed in the column of the degree of refreshness. When the user designates the range of possible numeral, the numerals may also be displayed together with the graph.

Figure 8:
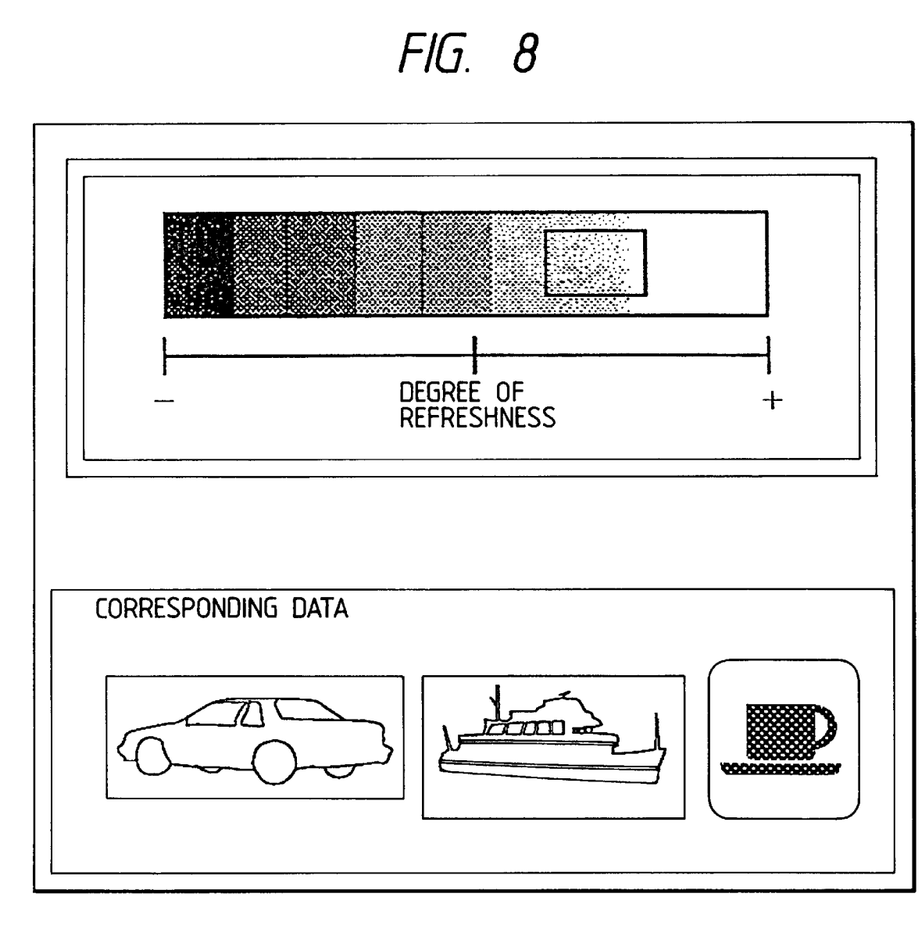
FIG. 8 illustrates an operation in retrieving data.

The retrieval of the registered data is now explained. FIG. 8 shows a screen displayed on the display 1 when the degree of refreshness is selected as the key word (attribute information) in the retrieval operation.

When the item of the degree of refreshness is selected by the console unit 3 in the retrieval operation, the screen of FIG. 8 is displayed. When the range of retrieval on the graph is designated by the pointing device, the CPU 10 detects a minimum degree and a maximum degree within the range. Data in the corresponding range of the data stored in the memory 14 is read from the memory 14 and the image corresponding to the read image data is displayed in the image display area at the bottom of the screen. When there are a plurality of corresponding images, they may be displayed in reduced form depending on the number of images.

In the present embodiment, the same graphic is used for the operations of registration, display and retrieval and the registration and retrieval may be easily conducted in sense of feeling. Thus, the burden to the user is reduced. Further, an optimum method may be provided for the retrieval of data by feeling.

Figure 9:
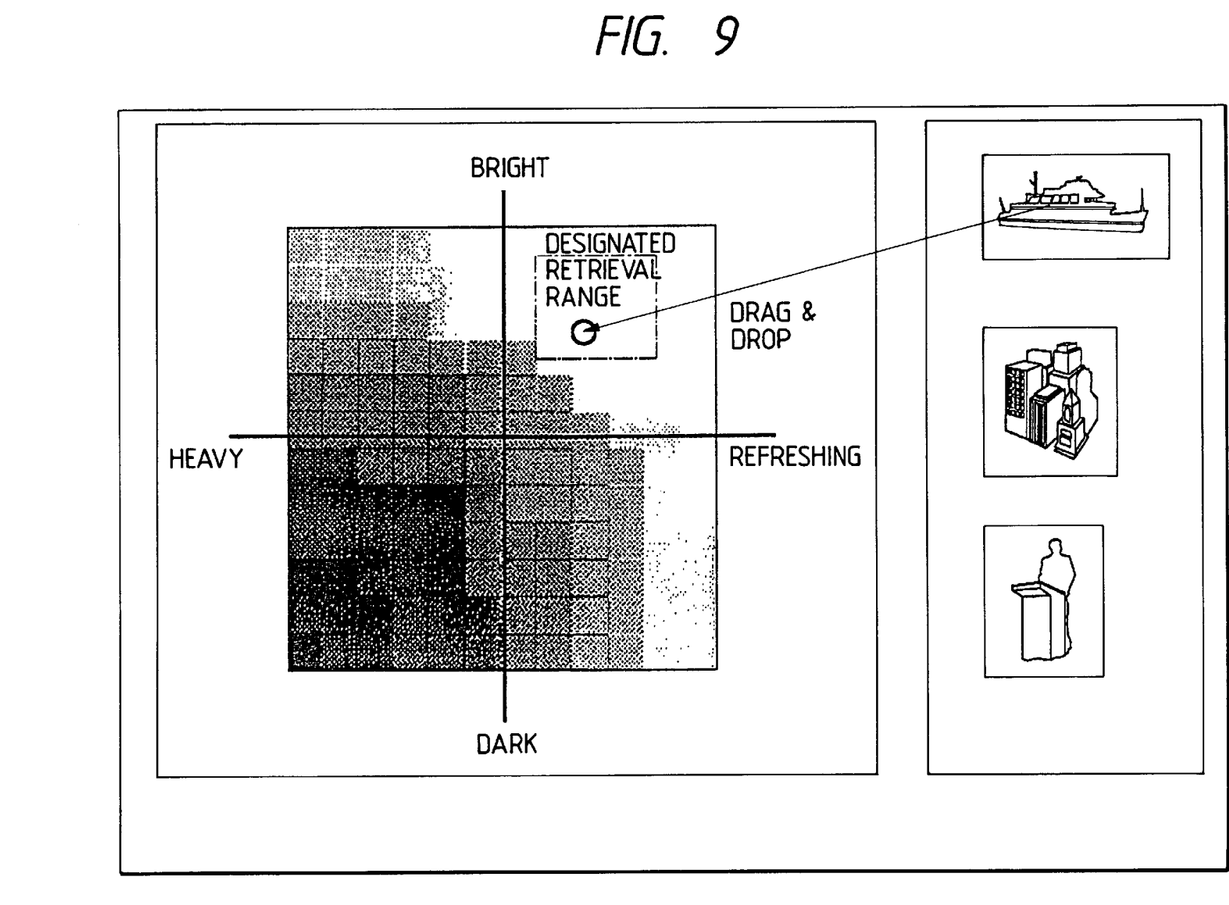
FIG. 9 illustrates an operation in registering two attribute information.

In the above embodiment, one attribute information is graphically represented for registration and retrieval. Similarly, two attribute information may be registered and retrieved. FIG. 9 shows a manner to select the degree of brightness and the degree of refreshness as the attribute information and display them two-dimensionally.

When the user directly enters the plurality of related parameters, the burden increases more than that required to handle one parameter, but by drugging and dropping data on the two-dimensional graph, the data may be readily registered.

In the retrieval operation, the range of retrieval is designated on the two-dimensional graph shown in FIG. 9 as it is in the previous embodiment. The images in the retrieval range are displayed on the right side of the screen.

In the registration of the data, the image corresponding to the adjacent data is displayed as it is in the previous embodiment. An operation when the degree of brightness nb and the degree of refreshness nc are designated on the two-dimensional graph is explained with reference to a flow chart of FIG. 10.

Figure 10:
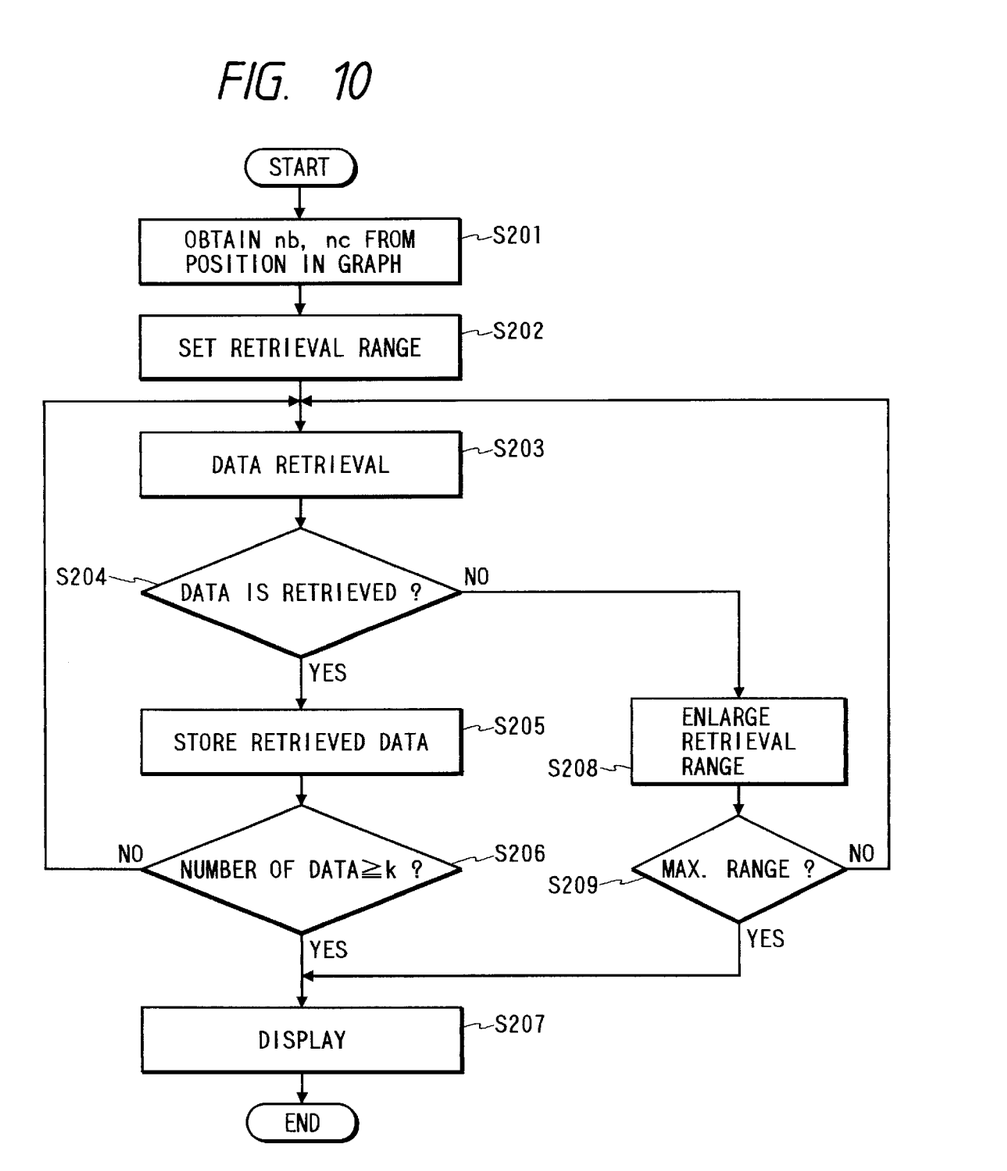
FIG. 10 illustrates an operation in registering data together with two attribute information.

The CPU 10 detects the degrees nb and nc from the position of the cursor on the graph (step S201). It sets a minimum retrieval range, for example, the degree equal to the detected degree as the retrieval range (step S202). After the retrieval range is set, whether there is data in the retrieval range or not is detected, and if there is, the corresponding data is read from the memory 14 and stored in the RAM 11 (steps S203 to S205).

Whether the number of data is equal to or larger than a preset number k or not is determined, and if it is smaller than k, whether there is corresponding data in the same retrieval range or not is determined.

If the corresponding data is not present in the same retrieval range in the step S204, the retrieval range is expanded forward and backward by one step both for the degree of brightness and the degree of refreshness (step S208), whether the range is maximum or not is determined (step S209), and if not maximum, the data is retrieved again in that range.

If the retrieval range is maximum in the step S209, the image corresponding to the data stored in the RAM 11 and the fact that the number of data detected is smaller than the preset number k are displayed in a step S207.

Figure 11:
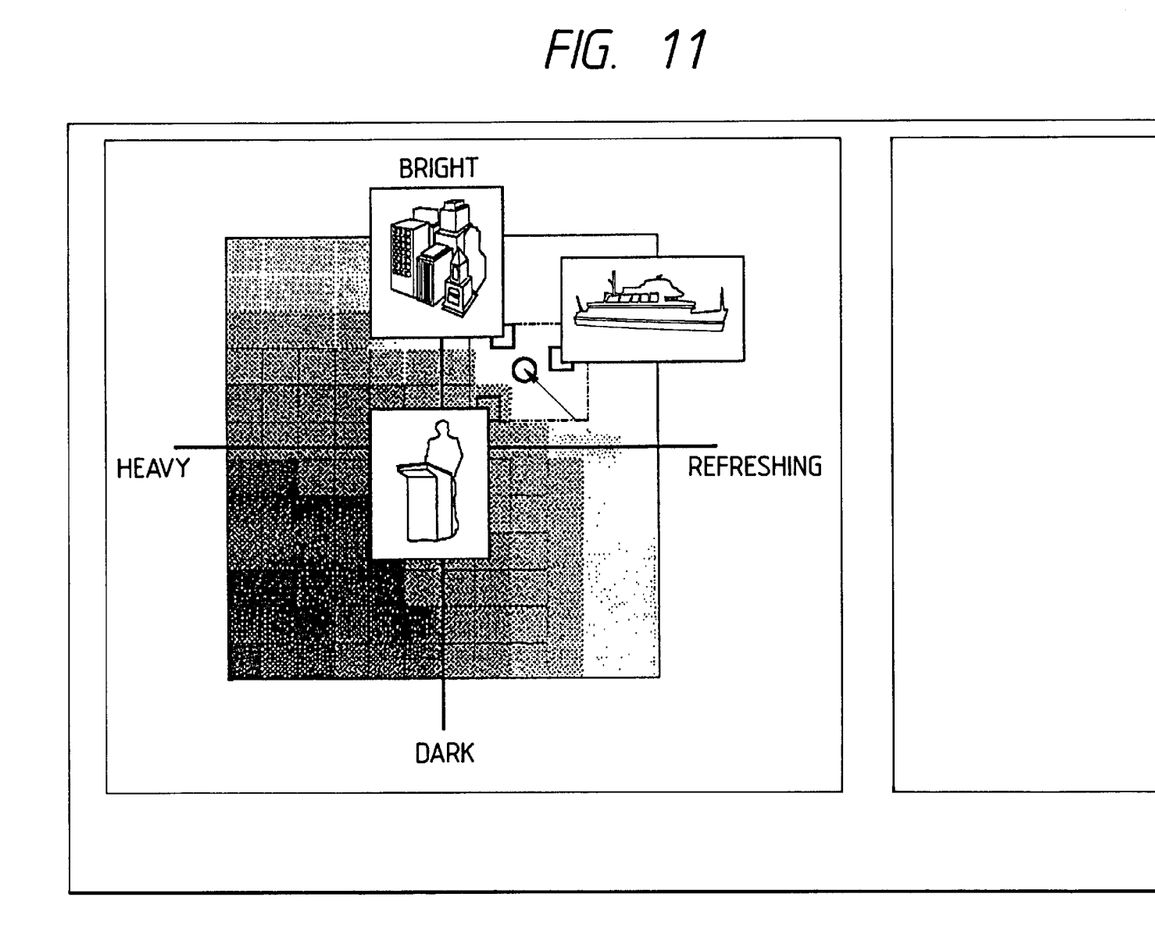
FIG. 11 illustrates an operation in registering data together with two attribute information while registered data is displayed.

If the number of data detected is equal to or larger than the preset number k in the step S206 the images corresponding to the detected data are displayed. If no data is detected, it is displayed and the process is terminated. An example of display is shown in FIG. 11. In this example, the preset value is 3 and three data have been detected.

In the present embodiment, when two attribute information are registered and retrieved, the two-dimensional graph is used so that the burden to the user is reduced and the data may be registered and retrieved in a simple operation.

Figure 12:
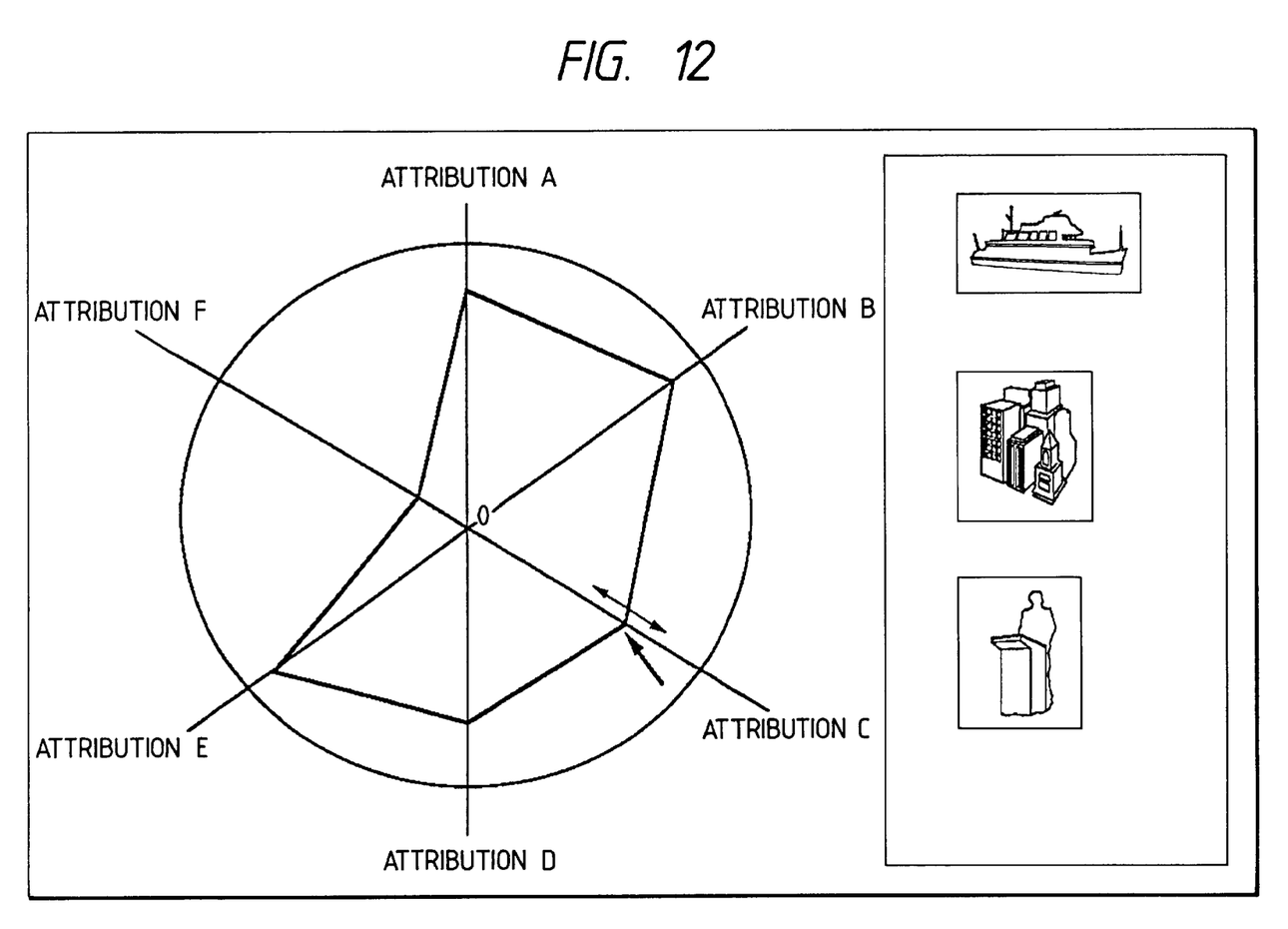
FIG. 12 illustrates an operation in registering data together with a plurality of attribute information.

More than two data may be registered at a time. FIG. 12 illustrates an example when six parameters are registered. If the user is to directly enter the six related parameters, it would be a big burden to the user. By graphically representing as shown in FIG. 12 and designating by the icon, the registration may be made in a simple operation.

In accordance with the first embodiment, the graph or graphics representing the possible values of the attribute information of the multimedia information to be stored is displayed and a desired position on the graph or graphics is pointed to store the multimedia data and the attribute information. Thus, the storing operation of the data may be conducted in a simple and feeling manner and the burden to the user is reduced.

Further, by using the common graph to store and retrieve the data, the operability is improved in the store operation as well as in the retrieval operation.

In the data retrieval operation, the attribute information is graphically displayed and the retrieval range is designated on the graph. Thus, the retrieval may be conducted in a simple operation and the operability is highly improved.

What is claimed is:

1. A processing apparatus comprising:
    (a) generating means for generating multimedia data;
    (b) display means for displaying a graphic where coordinates on the graphic correspond respectively to values of attribute data, the graphic representing the degree to which an item of multimedia data affects a user's sense;
    (c) designation means for designating a desired position on the graphic;
    (d) generation means for generating information representing the degree of sense that is set according to a position on the graphic, in accordance with the designation by said designation means; and
    (e) registration means for registering the information representing the degree of sense generated by said generation means to the multimedia data as information for retrieving the multimedia data.

2. An apparatus according to claim 1, wherein, when said designation means designates the desired position, said display means also displays, in a reduced form, another image to which the attribute data has already been registered and which is different from the image to which attribute data is currently to be registered.

3. An image processing apparatus which registers attribute data to image data, comprising:

input means for inputting the image data;

display means for displaying, by a graphic, coordinates respectively corresponding to a value of the attribute data;

designation means for designating a desired position on the graphic; and registration means for registering a value corresponding to the designated position as a value for retrieving the image data, according to designation by said designation means, wherein, when said designation means designates the desired position, said display means displays, in a reduced form, another image to which the attribute data has already been registered and which is different from the image to which attribute data is currently to be registered, at a position according to the registered attribute data of the reduced other image.

4. An apparatus according to claim 3, wherein said display means displays one or more images of data that has already been registered according to a position that was designated on the graphic by said designation means.

5. An image processing method which registers attribute data to image data, comprising:

an input step of inputting the image data;

a display step of displaying, by a graphic, coordinates respectively corresponding to a value of the attribute data;

a designation step of designating a desired position on the graphic; and a registration step of registering a value corresponding to the designated position as a value for retrieving the image data, according to designation in said designation step, wherein, when the desired position is designated in said designation step, said display step also displays, in a reduced form, another image to which the attribute data has already been registered and which is different from the image to which attribute data is currently to be registered, at a position according to the registered attribute data of the reduced other image.

* * * * *

UNITED STATES PATENT AND TRADEMARK OFFICE
CERTIFICATE OF CORRECTION

PATENT NO. : 6,333,748 B1
DATED : December 25, 2001
INVENTOR(S) : Hideo Takiguchi et al.

It is certified that error appears in the above-identified patent and that said Letters Patent is hereby corrected as shown below:

Title page,
Item [57], ABSTRACT, line 8, "form" should read -- from --.

Column 2,
Line 1, "By" should read -- for --.

Column 5,
Line 46, "drugging" should read -- dragging --.

Signed and Sealed this

Twenty-third Day of April, 2002

*Attest:*

JAMES E. ROGAN
*Attesting Officer*   *Director of the United States Patent and Trademark Office*